United States Patent
Xue et al.

(10) Patent No.: US 12,501,140 B2
(45) Date of Patent: Dec. 16, 2025

(54) IMAGE ACQUISITION APPARATUS AND DEFECT DETECTION SYSTEM OF ELECTRODE PLATE

(71) Applicant: CONTEMPORARY AMPEREX TECHNOLOGY (HONG KONG) LIMITED, Hong Kong (CN)

(72) Inventors: Yucong Xue, Fujian (CN); Zhipeng Chen, Fujian (CN); Chao Chen, Fujian (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 145 days.

(21) Appl. No.: 18/381,182

(22) Filed: Oct. 18, 2023

(65) Prior Publication Data

US 2024/0214663 A1    Jun. 27, 2024

Related U.S. Application Data

(63) Continuation of application No. PCT/CN2023/093598, filed on May 11, 2023.

(30) Foreign Application Priority Data

Dec. 27, 2022 (CN) .......................... 202223483010.4

(51) Int. Cl.
*H04N 23/56* (2023.01)
(52) U.S. Cl.
CPC .................................. *H04N 23/56* (2023.01)
(58) Field of Classification Search
CPC ..................................................... H04N 23/56
See application file for complete search history.

(56) References Cited

U.S. PATENT DOCUMENTS

2009/0136115 A1* 5/2009 Sotooka ........... G01N 21/95684
    382/141
2018/0012350 A1* 1/2018 Gangitano ......... G01N 21/8806

FOREIGN PATENT DOCUMENTS

CN    113532335 A    10/2021
CN    114739289 A  *  7/2022
(Continued)

OTHER PUBLICATIONS

International Search Report and Written Opinion mailed on Sep. 6, 2023, received for PCT Application PCT/CN2023/093598, filed on May 11, 2023, 16 pages including English Translation.
(Continued)

*Primary Examiner* — Jonathan R Messmore
(74) *Attorney, Agent, or Firm* — XSENSUS LLP

(57) ABSTRACT

An image acquisition apparatus includes a camera, a first light source, a second light source, and a lens. The first light source is configured to emit first light toward one electrode plate so as to illuminate a local portion of the electrode plate, and the first light source emits the first light at an angle such that the first light is able to be reflected to the camera via the electrode plate. The second light source is configured to emit second light toward the other electrode plate so as to illuminate a local portion of the other electrode plate. The lens includes a reflective region, where the reflective region is arranged at an angle to reflect the second light reflected by the second electrode plate to the camera, such that the camera acquires a stitched image of the positive and negative electrode plates.

12 Claims, 2 Drawing Sheets

(56) References Cited

FOREIGN PATENT DOCUMENTS

| | | |
|---|---|---|
| CN | 114778445 A | 7/2022 |
| CN | 115468957 A | 12/2022 |
| CN | 218726728 U | 3/2023 |
| JP | 2010-272250 A | 12/2010 |

OTHER PUBLICATIONS

Extended European Search Report issued Sep. 19, 2024 in European Patent Application No. 23786994.6.

* cited by examiner

IMAGE ACQUISITION APPARATUS AND DEFECT DETECTION SYSTEM OF ELECTRODE PLATE

CROSS-REFERENCE TO RELATED APPLICATIONS

This application is a continuation of International Application No. PCT/CN2023/093598, filed May 11, 2023, which claims priority to Chinese Patent Application No. 202223483010.4, filed on Dec. 27, 2022, each of which is incorporated herein by reference in its entirety.

TECHNICAL FIELD

This application relates to the field of battery technologies, and in particular, to an image acquisition apparatus and a defect detection system of electrode plate.

BACKGROUND

In recent years, new energy vehicles have developed by leaps and bounds, and in the field of electric vehicles, batteries play an irreplaceable and crucial role as power sources for the electric vehicles. Batteries, as core components of new energy vehicles, have high requirements for their safety. To guarantee safety of the batteries, it is necessary to inspect wound electrode assemblies in a process of winding the electrode assemblies of the batteries, so as to avoid safety accidents caused by outflow of defective electrode assemblies. Currently, a method of performing image acquisition and image analysis is often used to obtain detection results. However, an image acquisition apparatus has a complicated structure, high costs, and poor quality of acquired images, and defect detection accuracy to be improved.

SUMMARY

Embodiments of this application provide an image acquisition apparatus and a defect detection system of electrode plate, where the image acquisition apparatus has a simple structure and low costs, and is conducive to improving quality of acquired images of electrode plates, thereby improving accuracy in detecting defects of electrode assemblies.

According to a first aspect, an embodiment of this application provides an image acquisition apparatus. The image acquisition apparatus is configured to acquire images of a positive electrode plate and a negative electrode plate wound by a winding machine, one of the positive electrode plate and the negative electrode plate being a first electrode plate and the other being a second electrode plate. The image acquisition apparatus includes a camera, a first light source, a second light source, and a lens, where the first light source is configured to emit first light toward the first electrode plate so as to illuminate a local portion of the first electrode plate, and the first light source emits the first light at an angle such that the first light is able to be reflected to the camera via the first electrode plate; the second light source is configured to emit second light toward the second electrode plate so as to illuminate a local portion of the second electrode plate; and the lens includes a reflective region, where the reflective region is arranged at an angle to reflect the second light reflected by the second electrode plate to the camera, such that the camera acquires a stitched image of the first electrode plate and the second electrode plate, and the lens allows no interference present between a reflection path of the second light and a reflection path of the first light.

In the foregoing technical solution, two light sources are provided and match with the lens with the reflective region, so that the same camera is able to acquire images of the two electrode plates simultaneously, thereby allowing the image acquisition apparatus to have a simplified structure and low costs. In addition, the lens controls the reflection paths of the two light sources to have no interference, conducive to improving the quality of the acquired images, thereby improving the accuracy in detecting defects of wound electrode assemblies, reducing the probability of outflow of defective wound electrode assemblies, and improving safety of a battery.

In some embodiments, the lens further has a light-transmitting region, and the first light source emits the first light in a direction toward the light-transmitting region such that the first light runs through the light-transmitting region to irradiate the first electrode plate.

In the foregoing technical solution, it is conducive to determining the emission direction of the first light source such that no interference is present between the reflection path of the second light and the reflection path of the first light.

In some embodiments, the second light source emits the second light in a direction toward a portion of the second electrode plate that is wound on a winding mandrel of the winding machine, and the first light source emits the first light in a direction toward a portion of the first electrode plate that is not wound on the winding mandrel.

In the foregoing technical solution, the accuracy in detecting defects of wound electrode assemblies can be improved, the probability of outflow of defective wound electrode assemblies can be better reduced, and the safety of the battery can be further improved.

In some embodiments, the first light source is a line light source, and light spot width of the first light is adaptively greater than width of the first electrode plate.

In the foregoing technical solution, a central region and a tab region of the first electrode plate can be clearly illuminated, so that a high-quality image of the first electrode plate in an entire width direction can be acquired for analyzing defects of the first electrode plate more comprehensively and accurately, thereby better reducing the probability of outflow of defective electrode assemblies and further improving the safety of the battery.

In some embodiments, the second light source is a line light source, and light spot width of the second light is adaptively greater than width of the second electrode plate.

In the foregoing technical solution, a central region and a tab region of the second electrode plate can be clearly illuminated, so that a high-quality image of the second electrode plate in an entire width direction can be acquired for analyzing defects of the second electrode plate more comprehensively and accurately, thereby better reducing the probability of outflow of defective electrode assemblies and further improving the safety of the battery.

In some embodiments, a difference between optical path length M of reflected light of the first light and optical path length N of reflected light of the second light is less than depth of field of the camera.

In the foregoing technical solution, the requirements on the depth of field of the camera can be reduced, so that an image width of the first electrode plate is relatively close to that of the second electrode plate in the stitched image, conducive to clearly analyzing the defects of the first electrode plate and the second electrode plate and detecting the defects of the first electrode plate and the second electrode plate in the entire winding process by using the same camera.

In some embodiments, the first light source and the second light source are located on two sides of the camera, and a direction in which the first light source emits the first light intersects with a direction in which the second light source emits the second light.

In the foregoing technical solution, the first light source and the second light source are less likely to interfere with each other in mounting and adjustment, helping the reflected light of the first light and the reflected light of the second light enter the same camera without interference.

In some embodiments, the image acquisition apparatus further includes a mounting bracket. The camera, the first light source, and the second light source are all mounted on the mounting bracket.

In the foregoing technical solution, the camera, the first light source, and the second light source are all integrated on the same mounting bracket, facilitating integral mounting of the image acquisition apparatus in application scenarios and improvement of defect detection efficiency.

In some embodiments, the camera, the first light source, and the second light source are all rotatable relative to the mounting bracket to adjust angles.

In the foregoing technical solution, a receiving angle of the camera, an irradiation angle of the first light source, and an irradiation angle of the second light source can be separately adjusted based on a structure and size of the winding machine, a size of an electrode assembly, and the like, so that an application range of the image acquisition apparatus can be broadened.

In some embodiments, at least one of the camera, the first light source, and the second light source is adjustable in a mounting position relative to the mounting bracket.

In the foregoing technical solution, relative positions of at least two of the camera, the first light source, and the second light source can be changed, helping broaden the application range of the image acquisition apparatus.

According to a second aspect, an embodiment of this application further provides a defect detection system of electrode plate including the foregoing image acquisition apparatus.

BRIEF DESCRIPTION OF DRAWINGS

To describe the technical solutions of the embodiments of this application more clearly, the following briefly describes the accompanying drawings required for describing the embodiments. It is appreciated that the accompanying drawings below show merely some embodiments of this application and thus should not be considered as limitations on the scope. Persons of ordinary skill in the art may still derive other related drawings from the accompanying drawings without creative efforts.

Figure 1:
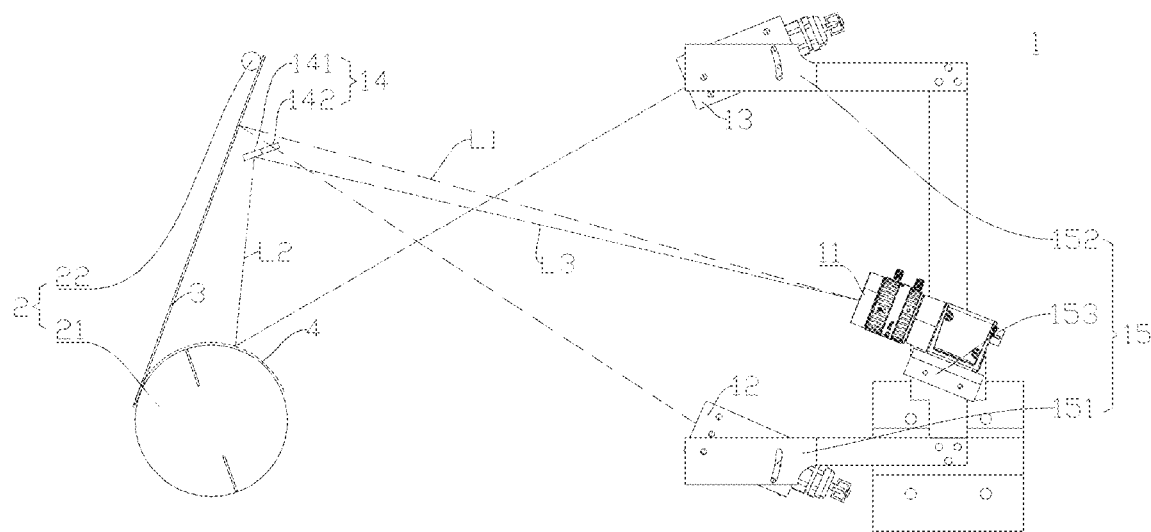
FIG. 1 is a schematic diagram of operation of an image acquisition apparatus according to some embodiments of this application from one perspective.

REFERENCE SIGNS image acquisition apparatus 1; camera 11; first light source 12; second light source 13; lens 14; reflective region 141; light-transmitting region 142; mounting bracket 15; first support 151; second support 152; third support 153; winding machine 2; winding mandrel 21; passing roller 22; first electrode plate 3; and second electrode plate 4.

DESCRIPTION OF EMBODIMENTS

To make the objectives, technical solutions, and advantages of the embodiments of this application clearer, the following clearly describes the technical solutions in the embodiments of this application with reference to the accompanying drawings in the embodiments of this application. Apparently, the embodiments described are some rather than all embodiments of this application. All other embodiments obtained by persons of ordinary skill in the art based on the embodiments of this application without creative efforts shall fall within the protection scope of this application.

Unless otherwise defined, all technical and scientific terms used in this application shall have the same meanings as commonly understood by those skilled in the art to which this application relates. The terms used in the specification of this application are intended to merely describe the specific embodiments rather than to limit this application. The terms "include", "comprise", and any variations thereof in the specification and claims of this application as well as the foregoing description of drawings are intended to cover non-exclusive inclusions. In the specification, claims, or accompanying drawings of this application, the terms "first", "second", and the like are intended to distinguish between different objects rather than to indicate a particular order or relative importance.

Reference to "embodiment" in this application means that specific features, structures, or characteristics described with reference to the embodiment may be included in at least one embodiment of this application. The word "embodiment" appearing in various places in the specification does not necessarily refer to the same embodiment or an independent or alternative embodiment that is exclusive of other embodiments.

In the description of this application, it should be noted that unless otherwise specified and defined explicitly, the terms "mount", "connect", "join", and "attach" should be understood in their general senses. For example, they may refer to a fixed connection, a detachable connection, or an integral connection, and may refer to a direct connection, an indirect connection via an intermediate medium, or an internal communication between two elements. Persons of ordinary skills in the art can understand specific meanings of these terms in this application as appropriate to specific situations.

The term "and/or" in this application is only an associative relationship for describing associated objects, indicating that three relationships may be present. For example, A and/or B may indicate three cases: presence of A; presence of both A and B; and presence of only B. In addition, the character "/" in this application generally indicates an "or" relationship between contextually associated objects.

In the embodiments of this application, like reference signs denote like components, and for brevity, in different embodiments, detailed descriptions of like components are not repeated. It should be understood that, as shown in the accompanying drawings, sizes such as thickness, length, and width of various components and sizes such as thickness, length, and width of integrated devices in the embodiments of this application are merely for illustrative purposes and should not constitute any limitations on this application.

In this application, "a plurality of" means more than two (inclusive).

In recent years, new energy vehicles have developed by leaps and bounds, and in the field of electric vehicles, batteries play an irreplaceable and crucial role as power sources for the electric vehicles. Batteries, as core components of new energy vehicles, have high requirements for their safety. To guarantee safety of the batteries, in a process of winding electrode assemblies of the batteries, it is necessary to perform various inspections on wound electrode assemblies, for example, inspecting alignment between edges of positive electrode plates and negative electrode plates, whether separators entirely wrap the positive electrode plates and the negative electrode plates, and yellow marking, bonding of tapes, decarburization of coating materials, cracking, folding of tabs, damage of the roots of the tabs, and the like. The electrode assemblies are reliably inspected in the winding process so as to avoid safety accidents caused by outflow of defective electrode assemblies.

Currently, the inspection of wound electrode assemblies typically includes acquiring images of electrode assemblies in the winding process and analyzing the images for inspection to determine whether the electrode assemblies are qualified. However, the inventors have found that in an image acquisition apparatus used in the current technical solution, two cameras need to match with multiple light sources to separately acquire images of positive and negative electrode plates, to be specific, one same camera matches with at least one light source to acquire images of the positive electrode plate, and the other same camera matches with the remaining at least one light source to acquire images of the negative electrode plate. Such image acquisition apparatus has a complicated structure and high costs. In addition, interference is present between reflected light of the multiple light sources, resulting in poor quality of the acquired images of electrode assemblies and low defect detection accuracy. As a result, there are still safety accidents caused by outflow of defective electrode assemblies.

Based on the above considerations, the inventors have designed an image acquisition apparatus through in-depth research. With a camera, two light sources, and a lens with a reflective region provided, a camera can acquire a stitched image of a positive electrode plate and a negative electrode plate, thereby simplifying the structure of the image acquisition apparatus and reducing the costs of the image acquisition apparatus. In addition, interference between reflection paths of the two light sources is avoided, so that quality of the positive electrode plate and the negative electrode plate in the stitched image can be improved, thereby improving accuracy in detecting defects of electrode assemblies, reducing the probability of outflow of defective electrode assemblies, and improving the safety of a battery.

In this application, a battery cell may include a lithium-ion secondary battery, a lithium-ion primary battery, a lithium-sulfur battery, a sodium-lithium-ion battery, a sodium-ion battery, a magnesium-ion battery, or the like. This is not limited in the embodiments of this application. The battery cell may be cylindrical, flat, cuboid, or of other shapes, which is not limited in the embodiments of this application either. Battery cells are typically divided into three types by packaging method: cylindrical cell, prismatic cell, and pouch cell. The type of battery is not limited in the embodiments of this application either.

The battery mentioned in the embodiments of this application is a single physical module that includes one or more battery cells for providing a higher voltage and capacity. For example, the battery mentioned in this application may include a battery module, a battery pack, or the like. The battery module includes a plurality of battery cells. The battery pack typically includes a box configured to enclose one or more battery cells or one or more battery modules. The box can prevent liquids or other foreign matter from affecting charging or discharging of the battery cell.

The battery cell includes a housing, an electrode assembly, and an electrolyte. The housing is configured to accommodate the electrode assembly and the electrolyte. The electrode assembly includes a positive electrode plate, a negative electrode plate, and a separator. Working of the battery cell mainly relies on migration of metal ions between the positive electrode plate and the negative electrode plate. A material of the separator is not limited, for example, may be polypropylene, polyethylene, or the like.

The positive electrode plate may typically include a positive electrode current collector and a positive electrode active substance layer. The positive electrode active substance layer is directly or indirectly applied on a surface of the positive electrode current collector. The part of positive electrode current collector uncoated with the positive electrode active substance layer protrudes out of the part of positive electrode current collector coated with the positive electrode active substance layer and serves as a positive electrode tab. A lithium-ion battery is used as an example, for which, the positive electrode current collector may be made of aluminum, and the positive electrode active substance layer may be made of lithium cobaltate, lithium iron phosphate, ternary lithium, lithium manganate, or the like.

The negative electrode plate may typically include a negative electrode current collector and a negative electrode active substance layer. The negative electrode active substance layer is directly or indirectly applied on a surface of the negative electrode current collector. The part of negative electrode current collector uncoated with the negative electrode active substance layer protrudes out of the part of negative electrode current collector coated with the negative electrode active substance layer and serves as a negative electrode tab. The negative electrode current collector may be made of copper, and the negative electrode active substance layer may be made of carbon, silicon, or the like.

The following describes an image acquisition apparatus 1 according to an embodiment of this application with reference to the accompanying drawings.

Figure 2:
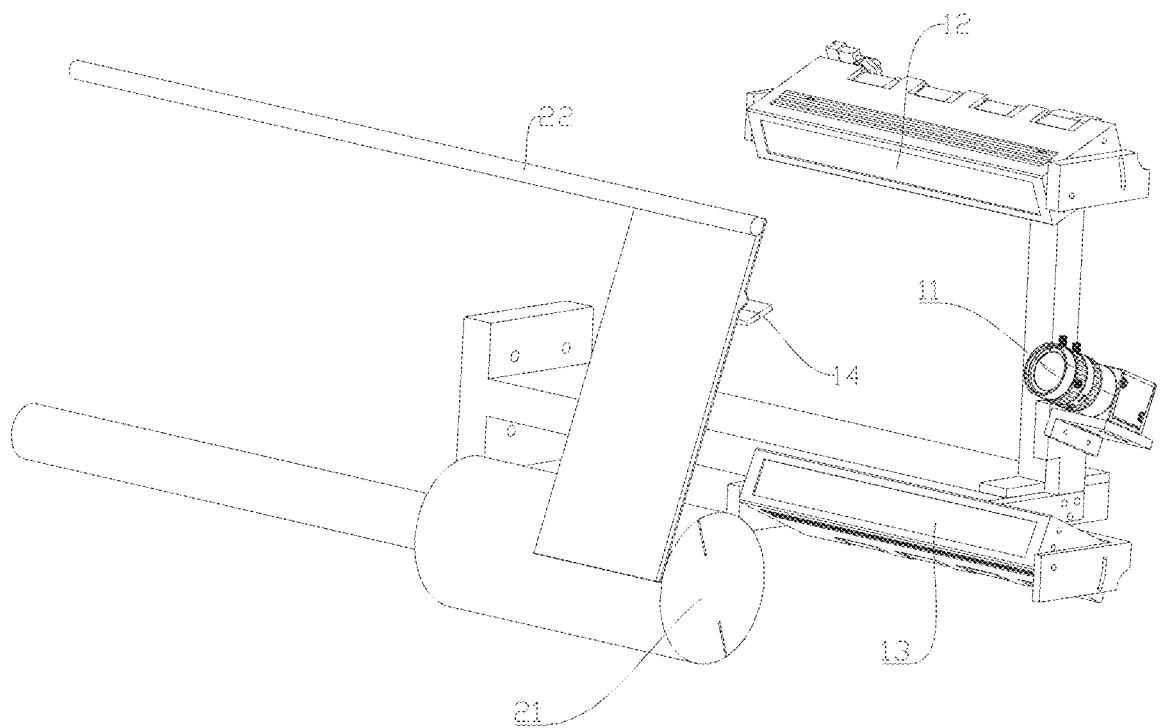
FIG. 2 is a schematic diagram of operation of an image acquisition apparatus according to some embodiments of this application from another perspective.

As shown in FIG. 1 and FIG. 2, the image acquisition apparatus 1 according to this embodiment of this application is configured to acquire images of a positive electrode plate and a negative electrode plate wound by a winding machine 2 during operation, so that a defect detection system of electrode plate can implement visual inspection on defects of electrode assemblies wound by the winding machine 2 during operation based on the images acquired by the image acquisition apparatus 1, so as to detect defects of the wound electrode assemblies, thereby reducing the probability of outflow of defective wound electrode assemblies and improving safety of a battery.

In the embodiments described below, one of the positive electrode plate and the negative electrode plate is defined as a first electrode plate 3, and the other is defined as a second electrode plate 4. For example, when the positive electrode plate is the first electrode plate 3, the negative electrode plate is the second electrode plate 4. For another example, when the positive electrode plate is the second electrode plate 4, the negative electrode plate is the first electrode plate 3.

As shown in FIG. 1, the image acquisition apparatus 1 includes a camera 11, a first light source 12, a second light source 13, and a lens 14. The first light source 12 is configured to emit first light toward the first electrode plate 3 so as to illuminate a local portion of the first electrode plate 3, and the first light source 12 emits the first light at an angle such that the first light is able to be reflected to the camera 11 via the first electrode plate 3. The second light source 13 is configured to emit second light toward the second electrode plate 4 so as to illuminate a local portion of the second electrode plate 4. The lens 14 includes a reflective region 141, where the reflective region 141 is arranged at an angle to reflect the second light reflected by the second electrode plate 4 to the camera 11, such that the camera 11 acquires a stitched image of the first electrode plate 3 and the second electrode plate 4, and the lens 14 allows no interference present between a reflection path of the second light and a reflection path of the first light.

As shown in FIG. 1, when the image acquisition apparatus 1 operates, the first light source 12 emits the first light toward the first electrode plate 3 to illuminate the local portion of the first electrode plate 3, and the first electrode plate 3 reflects the first light to the camera 11, so that the camera 11 acquires an image of the illuminated local portion of the first electrode plate 3, and therefore defects of the local portion of the first electrode plate 3 can be analyzed based on the image.

As shown in FIG. 1, when the image acquisition apparatus 1 operates, the second light source 13 emits the second light toward the second electrode plate 4 to illuminate the local portion of the second electrode plate 4, the second electrode plate 4 reflects the second light to the reflective region 141 of the lens 14, and then the reflective region 141 reflects the light to the camera 11. In other words, after irradiating on the second electrode plate 4, the second light is reflected first by the second electrode plate 4 to form a first reflection onto the reflective region 141 of the lens 14 and then reflected by the reflective region 141 to form a second reflection onto the camera 11, so that the camera 11 acquires an image of the illuminated local portion of the second electrode plate 4, and therefore defects of the local portion of the second electrode plate 4 can be analyzed based on the image.

Figure 3:
FIG. 3 is a schematic diagram of a stitched image acquired by a camera of an image acquisition apparatus according to some embodiments of this application.

As described above, both the reflected light of the first light and the reflected light of the second light enter the same camera 11, so that the camera 11 can simultaneously acquire a stitched image (for example, as shown in FIG. 3) of the image (for example, region p1 shown in FIG. 3) of the illuminated local portion of the first electrode plate 3 and the image (for example, region p2 shown in FIG. 3) of the illuminated local portion of the second electrode plate 4. To be specific, a part of the field of view of the camera 11 is used for shooting an image of an illuminated region of the first electrode plate 3, and the rest of the field of view is used for shooting an image of an illuminated region of the second electrode plate 4 via the reflective region 141 of the lens 14. The camera 11 is not limited to a specific type, for example, may be a high-frame-rate small-format camera. This is not limited herein.

The stitched image may be subsequently processed to separately extract the image of the first electrode plate 3 and the image of the second electrode plate 4. For example, when the image of the first electrode plate 3 and the image of the second electrode plate 4 are being extracted, the stitched image can be cut to obtain a local image (for example, region p1 shown in FIG. 3) of the first electrode plate 3 and a local image (for example, region p2 shown in FIG. 3) of the second electrode plate 4.

It can be understood that as the winding machine 2 operates, both the first electrode plate 3 and the second electrode plate 4 move continuously, so that the illuminated region of the first pole sheet 3 changes continuously and the illuminated region of the second pole sheet 4 also changes continuously. Therefore, multiple consecutive cut local images of the first electrode plate 3 can be stitched in sequence to synthesize an entire winding image of the first electrode plate 3 in the entire winding process, and multiple consecutive cut local images of the second electrode plate 4 can be stitched in sequence to synthesize an entire winding image of the second electrode plate 4 in the entire winding process. In this way, the images of the first electrode plate 3 and the second electrode plate 4 can be acquired in the entire winding process, so that defects of electrode assemblies can be analyzed comprehensively and accurately, thereby reducing the probability of outflow of defective electrode assemblies and improving the safety of the battery.

As shown in FIG. 1, provision of the lens 14 with the reflective region 141 can change the reflection path of the second light. This can not only ensure that the reflected light of the second light can enter the camera 11, but also avoid interference between the reflection path of the second light and the reflection path of the first light. In other words, a path of the first light from leaving the first electrode plate 3 to entering the camera 11 (for example, a first path L1 shown in FIG. 1) and a path of the second light from leaving the second electrode plate 4 to entering the camera 11 (for example, a second path L2 and a third path L3 shown in FIG. 1) do not cross or overlap, so that the camera 11 can acquire a high-quality image of the illuminated region of the first electrode plate 3 and a high-quality image of the illuminated region of the second electrode plate 4, achieving high image quality of the first electrode plate 3 and the second electrode plate 4 in the stitched image, thereby improving accuracy in detecting the defects of wound electrode assemblies, reducing the probability of outflow of defective electrode assemblies, and improving the safety of the battery.

In the foregoing technical solution, the image acquisition apparatus 1 is provided with the first light source 12, the second light source 13, and the lens 14 with the reflective region 141, so that the same camera 11 can be used to acquire the stitched image of the positive electrode plate and the negative electrode plate. This can reduce the number of the cameras 11 and facilitate fixed mounting of the camera 11, thereby simplifying the structure of the image acquisition apparatus 1 and reducing the costs of the image acquisition apparatus 1. Provision of the lens 14 avoids the interference between the reflection paths of the two light sources, so that the quality of the positive electrode plate and the negative electrode plate in the stitched image can be improved, thereby improving the accuracy in detecting the defects of electrode assemblies, reducing the probability of outflow of defective electrode assemblies, and improving the safety of the battery.

In some embodiments, as shown in FIG. 1, the lens 14 further has a light-transmitting region 142, and the first light source 12 emits the first light in a direction toward the light-transmitting region 142 such that the first light runs through the light-transmitting region 142 to irradiate the first electrode plate 3. In this way, provision of the light-transmitting region 142 on the lens 14 facilitates rapid determining of the emission direction of the first light source 12 such that no interference is present between the reflection path of the second light and the reflection path of the first light.

Moreover, provision of both the light-transmitting region 142 and the reflective region on the lens 14 facilitates shortening of the path of the first light entering the camera 11 (for example, the first path L1 shown in FIG. 1) and the path of the second light entering the camera 11 (for example, the third path L3 shown in FIG. 1), thereby facilitating centralized arrangement and debugging of the camera 11, and even allowing for only one camera 11 provided, reducing the costs.

It should be noted that areas occupied by the light-transmitting region 142 and the reflective region 141 on the lens 14 are not limited and can be set based on actual requirements. In addition, the specific structure and shape of the lens 14 are not limited, may be designed as appropriate to actual situations, and are not limited herein.

In some embodiments, as shown in FIG. 1, the second light source 13 emits the second light in a direction toward a portion of the second electrode plate 4 that is wound on a winding mandrel 21 of the winding machine 2. It should be noted that the winding machine 2 includes the winding mandrel 21, the first electrode plate 3 and the second electrode plate 4 are separately wound on the winding mandrel 21 via a passing roller 22, the first electrode plate 3 and the second electrode plate 4 wound on the winding mandrel 21 are stacked, and a separator is sandwiched between the first electrode plate 3 and the second electrode plate 4.

It can be seen that defects displayed in an image closer to the stacking position on the winding mandrel 21 are closer to ultimate defects of wound electrode assemblies. Therefore, when the second light source 13 emits the second light in the direction toward the portion of the second electrode plate 4 that is wound on the winding mandrel 21 of the winding machine 2, the ultimate defects of the wound electrode assemblies can be better and more accurately detected by analyzing defects of the portion of the second electrode plate 4 that has been wound on the winding mandrel 21, thereby more effectively reducing the probability of outflow of defective electrode assemblies and improving the safety of the battery.

In addition, it should be noted that the second light emitted by the second light source 13 may directly irradiate on the portion of the second electrode plate 4 that is wound on the winding mandrel 21 of the winding machine 2, without being limited thereto, and the second light emitted by the second light source 13 may alternatively run through the separator covering the second electrode plate 4 to indirectly irradiate on the second electrode plate 4. Details are not described herein.

Further, as shown in FIG. 1, when the second light source 13 emits the second light in the direction toward the portion of the second electrode plate 4 that is wound on the winding mandrel 21 of the winding machine 2, and the first light source 12 emits the first light in a direction toward a portion of the first electrode plate 3 that is not wound on the winding mandrel 21 (that is, a wound portion of the first electrode plate 3 that is located between the passing roller 22 and the winding mandrel 21). This facilitates arrangement of the lens 14, the camera 11, the first light source 12, and the second light source 13, so that the camera 11 can acquire the stitched image of the first electrode plate 3 and the second electrode plate 4.

In some embodiments, as shown in FIG. 1 and FIG. 2, the first light source 12 is a line light source, and light spot width of the first light is adaptively greater than width of the first electrode plate 3. To be specific, a light spot formed on an object by the first light emitted by the first light source 12 is elongated, and length of the elongated light spot is greater than width of the first electrode plate 3. In this way, a central region and a tab region of the first electrode plate 3 can be clearly illuminated, so that a high-quality image of the first electrode plate 3 in an entire width direction can be acquired for analyzing defects of the first electrode plate 3 more comprehensively and accurately, thereby better reducing the probability of outflow of defective electrode assemblies and further improving the safety of the battery. For example, the first light source 12 may be a miniature line-scan light source, so that an imaging effect and detection accuracy can be improved.

The inventors have found that if a point light source is used, a poor lighting effect is generated in the tab region, so it is difficult to implement accurate detection of the tab region. A line light source is used to replace the point light source, and light spot width of the first light is set to be greater than the width of the first electrode plate 3, facilitating comprehensive acquisition of a high-quality image of the first electrode plate 3 in the entire width direction including the tab region, and therefore the defects of the first electrode plate 3 can be analyzed comprehensively and accurately.

In some embodiments, as shown in FIG. 1 and FIG. 2, the second light source 13 is a line light source, and light spot width of the second light is adaptively greater than width of the second electrode plate 4. To be specific, a light spot formed on an object by the second light emitted by the second light source 13 is elongated, and length of the elongated light spot is greater than width of the second electrode plate 4. In this way, a central region and a tab region of the second electrode plate 4 can be clearly illuminated, so that a high-quality image of the second electrode plate 4 in an entire width direction can be acquired for analyzing defects of the second electrode plate 4 more comprehensively and accurately, thereby better reducing the probability of outflow of defective electrode assemblies and further improving the safety of the battery. For example, the second light source 13 may be a miniature line-scan light source, so that an imaging effect and detection accuracy can be improved.

The inventors have found that if a point light source is used, a poor lighting effect is generated in the tab region, so it is difficult to implement accurate detection on the tab region. A line light source is used to replace the point light source, and light spot width of the first light is set to be greater than the width of the second electrode plate 4, facilitating comprehensive acquisition of a high-quality image of the second electrode plate 4 in the entire width direction including the tab region, and therefore the defects of the second electrode plate 4 can be analyzed comprehensively and accurately.

In addition, as shown in FIG. 2 and FIG. 3, when both the first light source 12 and the second light source 13 are line light sources, such as miniature line-scan light sources, the imaging interference between the first electrode plate 3 and the second electrode plate 4 can be effectively avoided, facilitating accurate extraction of the images of the first electrode plate 3 and the second electrode plate 4 from the stitched image, so that full-width defects of the first electrode plate 3 and the second electrode plate 4 can be separately analyzed.

In some embodiments, as shown in FIG. 1 and FIG. 2, a difference between optical path length M of reflected light of the first light and optical path length N of reflected light of the second light is less than depth of field of the camera 11. In other words, the optical path length M of the reflected light of the first light is relatively close to the optical path length N of the reflected light of the second light. For example, as shown in FIG. 1, the optical path length M of reflected light of the first light is length of the first path L1 shown in FIG. 1, and the optical path length N of reflected light of the second light is a sum of length of the second path L2 and length of the third path L3 shown in FIG. 1. In this way, the difference between the optical path length M of the reflected light of the first light and the optical path length N of the reflected light of the second light is set to be less than the depth of field of the camera 11, so that the requirements on the depth of field of the camera 11 can be lowered, making an image width of the first electrode plate 3 relatively close to that of the second electrode plate 4 in the stitched image. This is conducive to clearly analyzing the defects of the first electrode plate 3 and the second electrode plate 4 and detecting the defects of the first electrode plate 3 and the second electrode plate 4 in the entire winding process by using the same camera 11.

In some embodiments, as shown in FIG. 1 and FIG. 2, the first light source 12 and the second light source 13 are located on two sides of the camera 11, and a direction in which the first light source 12 emits the first light intersects with a direction in which the second light source 13 emits the second light. In this way, the first light source 12 and the second light source 13 are less likely to interfere with each other in mounting and adjustment, helping broaden an application range and helping the reflected light of the first light and the reflected light of the second light enter the same camera 11 without interference.

Certainly, this application is not limited thereto. For example, in another embodiment, the first light source 12 and the second light source 13 may alternatively be disposed on a same side of the camera 11, and irradiation angles are adjusted to ensure that no interference is present between the reflection path of the second light and the reflection path of the first light.

In some embodiments, as shown in FIG. 1 and FIG. 2, the image acquisition apparatus 1 further includes a mounting bracket 15. The camera 11, the first light source 12, and the second light source 13 are all mounted on the mounting bracket 15. In this way, the camera 11, the first light source 12, and the second light source 13 are all integrated on the same mounting bracket 15, facilitating integral mounting of the image acquisition apparatus 1 in application scenarios and improvement of defect detection efficiency.

In some embodiments, the camera 11, the first light source 12, and the second light source 13 are all rotatable relative to the mounting bracket 15 to adjust angles. In this way, a receiving angle of the camera 11, an irradiation angle of the first light source 12, and an irradiation angle of the second light source 13 can be adjusted separately based on a structure and size of the winding machine 2, a size of an electrode assembly, and the like, so that an application range of the image acquisition apparatus 1 can be broadened.

For example, the camera 11 has a rotatable angle amplitude of 5°-15°, the first light source 12 has a rotatable angle amplitude of 5°-15°, and the second light source 13 has a rotatable angle amplitude of 5°-15°. In this way, adjustable ranges of the camera 11, the first light source 12, and the second light source 13 are large, but not excessively so. This is conducive to improving adjustment efficiency while satisfying an adjustment effect, thereby facilitating improvement of defect detection efficiency.

For example, in some specific examples, as shown in FIG. 1 and FIG. 2, a first support 151 and a second support 152 are provided on two ends of the mounting bracket 15, where the first light source 12 is rotatably mounted on the first support 151 via a first rotating shaft, the second light source 13 is rotatably mounted on the second support 152 via a second rotating shaft, a third support 153 is provided at a position between the two ends of the mounting bracket 15, and the camera 11 is rotatably mounted on the third support 153 via a third rotating shaft, so that the camera 11, the first light source 12, and the second light source 13 are all rotatable relative to the mounting bracket 15 to adjust angles.

Optionally, as shown in FIG. 1 and FIG. 2, the first light source 12 is located at a lower end of the mounting bracket 15, the emission direction of the first light source 12 tilts upward, and an included angle between the emission direction of the first light source 12 and the horizontal plane can be adjusted within a range of 30°-40°. The second light source 13 is located at an upper end of the mounting bracket 15, the emission direction of the second light source 13 tilts downward, and an included angle between the emission direction of the second light source 13 and the horizontal plane can be adjusted within a range of 15°-25°. The camera 11 is located between the upper end and the lower end of the mounting bracket 15, the receiving direction of the camera 11 tilts upward, and an included angle between the receiving direction of the camera 11 and the horizontal plane can be adjusted within a range of 20°-30°. In this way, the image acquisition apparatus 1 can have a large application range.

In some embodiments, as shown in FIG. 1 and FIG. 2, at least one of the camera 11, the first light source 12, and the second light source 13 is adjustable in a mounting position relative to the mounting bracket 15. In this way, relative positions of at least two of the camera 11, the first light source 12, and the second light source 13 can be changed, so that the mounting position of at least one of the camera 11, the first light source 12, and the second light source 13 relative to the mounting bracket 15 can be adjusted based on the structure and size of the winding machine 2, the size of the electrode assembly, and the like, and the application range of the image acquisition apparatus 1 can be broadened.

For example, in some specific examples, as shown in FIG. 1 and FIG. 2, the first support 151 and the second support 152 are provided on two ends of the mounting bracket 15, where the first light source 12 is connected to the first support 151 via a first sliding assembly, the first sliding assembly includes a first sliding member and a first sliding groove, the first sliding member can slide along the first sliding groove, and the first sliding groove may be a linear sliding groove, a cross sliding groove, or the like, so that the first light source 12 is adjustable in the mounting position relative to the mounting bracket. The second light source 13 is connected to the second support 152 via a second sliding assembly, the second sliding assembly includes a second sliding member and a second sliding groove, the second sliding member can slide along the second sliding groove, and the second sliding groove may be a linear sliding groove, a cross sliding groove, or the like, so that the second light source 13 is adjustable in the mounting position relative to the mounting bracket. The third support 153 is provided at the position between the two ends of the mounting bracket 15, where the camera 11 is connected to the third support 153 via a third sliding assembly, the third sliding assembly includes a third sliding member and a third sliding groove, the third sliding member can slide along the third sliding groove, and the third sliding groove may be a linear sliding groove, a cross sliding groove, or the like, so that the camera 11 is adjustable in the mounting position relative to the mounting bracket 15.

In some embodiments, as shown in FIG. 1 and FIG. 2, the camera 11, the first light source 12, and the second light source 13 are all rotatable relative to the mounting bracket 15 to adjust angles; and in addition, at least one of the camera 11, the first light source 12, and the second light source 13 is adjustable in a mounting position relative to the mounting bracket 15. In this way, in addition to an angle dimension, at least one of the camera 11, the first light source 12, and the second light source 13 can also be adjusted from a coordinate position dimension, so that the application range of the image acquisition apparatus 1 can be better broadened.

For example, in some specific examples, as shown in FIG. 1 and FIG. 2, the first support 151 and the second support 152 are provided on two ends of the mounting bracket 15, where the first light source 12 is connected to the first support 151 via the first sliding assembly, the first sliding assembly includes the first rotating shaft and the first sliding groove, the first rotating shaft can slide along the first sliding groove and rotate in the first sliding groove, and the first sliding groove may be the linear sliding groove, the cross sliding groove, or the like, so that the first light source 12 is adjustable in the mounting position and angle. The second light source 13 is connected to the second support 152 via the second sliding assembly, the second sliding assembly includes the second rotating shaft and the second sliding groove, the second rotating shaft can slide along the second sliding groove and rotate in the second sliding groove, and the second sliding groove may be a linear sliding groove, a cross sliding groove, or the like, so that the second light source 13 is adjustable in the mounting position and angle. The third support 153 is provided at the position between the two ends of the mounting bracket 15, where the camera 11 is connected to the third support 153 via the third sliding assembly, the third sliding assembly includes the third rotating shaft and the third sliding groove, the third rotating shaft can slide along the third sliding groove and rotate in the third sliding groove, and the third sliding groove may be a linear sliding groove, a cross sliding groove, or the like, so that the third light source is adjustable in the mounting position and angle.

In addition, this application further provides a defect detection system of electrode plate including the foregoing image acquisition apparatus 1. Due to the improved quality of the images acquired by the image acquisition apparatus 1, the accuracy of the defect detection system of electrode plate in detecting defects of wound electrode assemblies can be improved, the probability of outflow of defective wound electrode assemblies can be better reduced, and the safety of the battery can be further improved.

In the embodiments of this application, the specific composition of the defect detection system of electrode plate is not limited. For example, the defect detection system of electrode plate may further include an electric control assembly and a post-processing assembly, where the electric control assembly transmits a start signal, and the winding machine 2 operates; and the electric control assembly transmits a pulse signal to trigger the camera 11 to shoot images. The type of the camera 11 is not limited, for example, may be a high-frame-rate small-format camera for acquiring images of electrode plates in a real-time manner in a process of winding electrode assemblies. The post-processing assembly is configured to: cut an image acquired by the camera 11 into two small images, where one of the two small images is an image of the first electrode plate 3 and the other is an image of the second electrode plate 4; then stitch the cut image of the first electrode plate 3 with a subsequent cut image of the first electrode plate 3, and stitch the cut image of the second electrode plate 4 with a subsequent cut image of the second electrode plate 4, so as to shoot positive and negative electrode plates in a real-time manner in an entire process of winding electrode assemblies; and then process, detect, and analyze images to determine whether electrode assemblies are qualified products, allowing the qualified products after determining to flow into a next process, or otherwise the electrode assemblies to be discharged.

The following describes a defect detection system of electrode plate according to a specific embodiment of this application.

As shown in FIG. 1 and FIG. 2, in this embodiment, the image acquisition apparatus 1 of the defect detection system of electrode plate includes the single camera 11, the lens 14 with the light-transmitting region 142 and the reflective region 141, the first light source 12, and the second light source 13, where the first light source 12 and the second light source 13 are line-scan light sources. In this way, real-time global detection is performed on the positive and negative electrode plates in the winding process, allowing the defect detection system of electrode plate to detect the potential risks such as yellow marking, bonding of tapes, decarburization of coating materials, cracking, folding of tabs, and damage of the roots of the tabs.

When the image acquisition apparatus 1 is being mounted, a shooting angle of the camera 11 and an arrangement angle of the lens 14 are adjusted, so that half of the field of view of the camera 11 is used for shooting an image of an illuminated region of the wound first electrode plate 3, and the other half of the field of view is used for shooting an image of an illuminated region of the second electrode plate 4 on the winding mandrel 21 via the reflective region 141 of the lens 14. Reflective optical path length of the first light source 12 is relatively close to that of the second light source 13, so that the depth of field of the camera 11 allows compatibly shooting of the images of the positive and negative electrode plates.

When the winding mandrel 21 rotates, the electric control assembly transmits a pulse signal to trigger the camera 11 to shoot images. The post-processing assembly of the defect detection system of electrode plate is configured to: cut an image acquired by the camera 11 into two small images, where one of the two small images is an image of the first electrode plate 3 and the other is an image of the second electrode plate 4; then stitch the cut image of the first electrode plate 3 with a subsequent cut image of the first electrode plate 3, and stitch the cut image of the second electrode plate 4 with a subsequent cut image of the second electrode plate 4, so as to shoot positive and negative electrode plates in a real-time manner in an entire process of winding electrode assemblies; and then process, detect, and analyze images to determine whether electrode assemblies are qualified products, allowing the qualified products after determining to flow into a next process, or otherwise the electrode assemblies to be discharged.

For example, before the camera 11 shoots images, a calibration plate can be used to calculate pixel accuracy and calibrate a positive and negative electrode plates separately, so as to determine alignment between edges of the positive electrode plate and negative electrode plate, whether a separator entirely wraps the positive and negative electrode plates, and yellow marking, bonding of tapes, decarburization of coating materials, cracking, folding of tabs, damage of the roots of the tabs, and the like.

It should be noted that, without conflict, the embodiments and features in the embodiments in this application may be combined with each other.

The foregoing descriptions are merely preferred embodiments of this application which are not intended to limit this application. Persons skilled in the art understand that this application may have various modifications and variations. Any modifications, equivalent replacements, and improvements made without departing from the spirit and principle of this application shall fall within the protection scope of this application.

The invention claimed is:

1. An image acquisition apparatus, wherein the image acquisition apparatus is configured to acquire images of a positive electrode plate and a negative electrode plate wound by a winding machine, one of the positive electrode plate and the negative electrode plate being a first electrode plate and the other being a second electrode plate; and the image acquisition apparatus comprises:
   a camera;
   a first light source, the first light source being configured to emit first light toward the first electrode plate so as to illuminate a local portion of the first electrode plate, wherein the first light source emits the first light at an angle such that the first light is able to be reflected to the camera via the first electrode plate;
   a second light source, the second light source being configured to emit second light toward the second electrode plate so as to illuminate a local portion of the second electrode plate; and
   a lens, the lens comprising a reflective region and a light-transmitting region, wherein the reflective region is arranged at an angle to reflect the second light reflected by the second electrode plate to the camera, such that the camera acquires a stitched image of the first electrode plate and the second electrode plate, and the lens allows no interference present between a reflection path of the second light and a reflection path of the first light.

2. The image acquisition apparatus according to claim 1, wherein the first light source emits the first light in a direction toward the light-transmitting region such that the first light runs through the light-transmitting region to irradiate the first electrode plate.

3. The image acquisition apparatus according to claim 1, wherein the second light source emits the second light in a direction toward a portion of the second electrode plate that is wound on a winding mandrel of the winding machine, and the first light source emits the first light in a direction toward a portion of the first electrode plate that is not wound on the winding mandrel.

4. The image acquisition apparatus according to claim 1, wherein the first light source is a line light source, and light spot width of the first light is adaptively greater than width of the first electrode plate.

5. The image acquisition apparatus according to claim 1, wherein the second light source is a line light source, and light spot width of the second light is adaptively greater than width of the second electrode plate.

6. The image acquisition apparatus according to claim 1, wherein a difference between optical path length of reflected light of the first light and optical path length of reflected light of the second light is less than depth of field of the camera.

7. The image acquisition apparatus according to claim 1, wherein the first light source and the second light source are located on two sides of the camera, and a direction in which the first light source emits the first light intersects with a direction in which the second light source emits the second light.

8. The image acquisition apparatus according to claim 1, wherein the image acquisition apparatus further comprises a mounting bracket, and the camera, the first light source, and the second light source are all mounted on the mounting bracket.

9. The image acquisition apparatus according to claim 8, wherein the camera, the first light source, and the second light source are all rotatable relative to the mounting bracket to adjust angles.

10. The image acquisition apparatus according to claim 8, wherein at least one of the camera, the first light source, and the second light source is adjustable in a mounting position relative to the mounting bracket.

11. A defect detection system of electrode plate, comprising the image acquisition apparatus according to claim 1.

12. The image acquisition apparatus according to claim 1, wherein the lens includes only one reflective region, and the second light reflected by the second electrode plate travels directly to the one reflective region and the one reflective region reflects the light directly to the camera.

* * * * *